US012781562B2

(12) United States Patent
Simmons

(10) Patent No.: US 12,781,562 B2
(45) Date of Patent: Nov. 3, 2026

(54) DOOR OR WINDOW ELEMENT

(71) Applicant: David Andrew Simmons, Charleston, SC (US)

(72) Inventor: David Andrew Simmons, Charleston, SC (US)

(73) Assignee: David Andrew Simmons, Charleston, SC (US)

(*) Notice: Subject to any disclaimer, the term of this patent is extended or adjusted under 35 U.S.C. 154(b) by 212 days.

(21) Appl. No.: 18/888,367

(22) Filed: Sep. 18, 2024

(65) Prior Publication Data

US 2026/0078631 A1 Mar. 19, 2026

(51) Int. Cl.

| | |
|---|---|
| ***B32B 3/02*** | (2006.01) |
| ***E06B 3/66*** | (2006.01) |
| ***E06B 3/673*** | (2006.01) |
| ***E06B 3/677*** | (2006.01) |

(52) U.S. Cl.

CPC ................ *E06B 3/677* (2013.01); *E06B 3/66* (2013.01); *E06B 3/67352* (2013.01)

(58) Field of Classification Search

CPC ..... E06B 3/66; E06B 3/67343; E06B 3/67356

See application file for complete search history.

(56) References Cited

U.S. PATENT DOCUMENTS

| | | | | |
|---|---|---|---|---|
| 3,265,418 A * | 8/1966 | Diamond | B41J 29/02 | 403/376 |
| 10,550,626 B1 * | 2/2020 | Medina | E06B 3/5892 | |
| 2003/0190439 A1 * | 10/2003 | Gonzalez | F41H 5/0407 | 428/34 |

FOREIGN PATENT DOCUMENTS

| | | | |
|---|---|---|---|
| WO | WO-0159244 A1 * | 8/2001 | E06B 3/26301 |

* cited by examiner

*Primary Examiner* — Elizabeth E Mulvaney

(74) *Attorney, Agent, or Firm* — Fox Rothschild LLP

(57) ABSTRACT

A window element includes a frame assembly configured to support an insulating glass unit, wherein the frame assembly includes an outer frame assembly, an insulating body assembly, an inner frame assembly, stop frame assembly and divider grid. The outer frame assembly and the inner frame assembly may include a plurality of mounting tabs, or continuous linear strips aligned to be received in a corresponding slots or continuous linear grooves to form mounting tab connections with the abutting insulation body by being adhered together with curing connection medium and mechanical fasteners. An insulating glass unit is inserted and sandwiched between the inner frame assembly and the outer frame assembly within the insulated body assembly, and includes at least two glass panes that are spaced apart to provide a sealed air space therebetween to create a thermal gap.

8 Claims, 10 Drawing Sheets

Figure 4-A
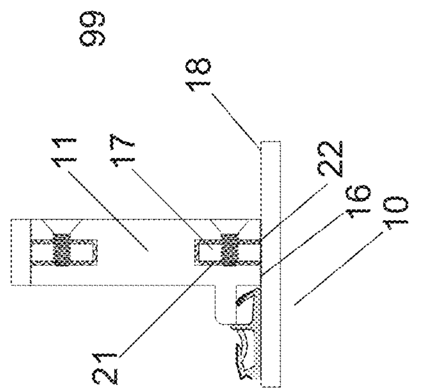

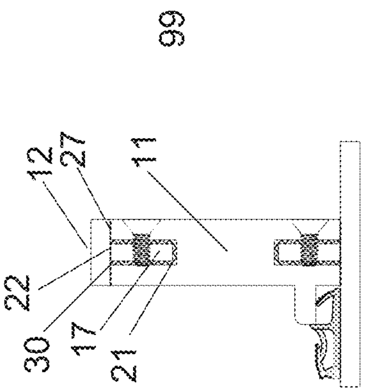
Figure 4-B

Figure 5-A
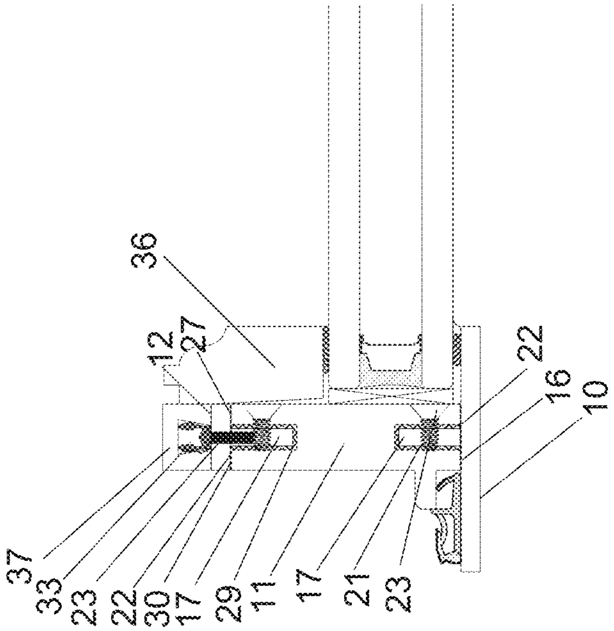
66

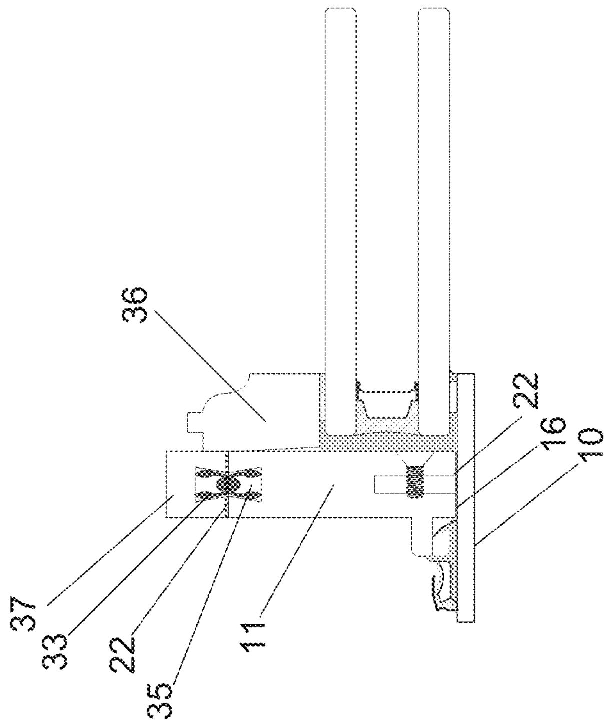
Figure 5-B

DOOR OR WINDOW ELEMENT

FIELD OF THE INVENTION

The invention is directed at a window or door element (collectively, a "window element") having a frame and an insulated glass pane inserted into the frame in a sandwich configuration.

BACKGROUND OF THE INVENTION

Typically, metal frames of such window and door elements are generally produced from hollow profiles, whereby it is known to use so-called insulated profiles, so that the outer metal frame surface is heat-insulated relative to the inner metal frame surface. These profiles are joined together to form a frame, in which the corners are frequently mitered. The insulated glass panes are then inserted into a frame produced in this manner, whereby the profile shapes of the frame elements can be configured very differently. The outer and/or inner surface of the frame may be formed by a flat metal frame, whereby an insulation body is positioned between the frame elements, using sandwich construction, so that the outer and/or inner surface of the frame is formed, in each instance, from a flat metal frame cut out from a planar metal plate or a metal strip, whereby an insulation body is positioned between the frame elements, using sandwich construction.

Elements having sandwich constructions may suffer delamination failures, requiring expensive repairs or replacement by building owners or the manufacturer. Determining and addressing root causes of delamination failures may require major investigation, engineering analysis, changes in product designs and manufacturing methods, and also may require long periods of testing. Undesired or unacceptable variations in product quality may result, over long periods of production. For reasons stated above and for other reasons which will become apparent to those skilled in the art upon reading and understanding the present specification, there is a need in the art for improved metal frame and glass pane door and window elements, systems including such elements, and methods for making the elements.

The following documents provide descriptions of various assemblies and methods of forming door and window elements using sandwich construction techniques, and each of these documents is hereby incorporated herein by reference, in their entireties:

U.S. Pat. No. 8,572,929—Window or Door Element

In the case of a window or door element having a metal frame and an insulated glass pane inserted into the frame, a solution is to be created, with which such window or door elements can be produced without requiring cold-forming, extrusion production of light-metal profiles, or another form of production of the frame elements. This is achieved in that the outer and/or inner surface of the frame is formed, in each instance, by a flat metal frame, wherein an insulation body is positioned between the frame elements, using sandwich construction.

U.S. Pat. No. 10,550,626—Metal Frame and Glass Pane Door Element, Window Element, Systems Including Same, and Method for Making Same An element, having an insulating glass unit mounted in a metal frame assembly, may include an outer frame assembly comprising a unitary outer frame assembly, a plurality of mounting studs projecting from said outer frame assembly in perpendicular relationship in a first pattern aligned with a first complementary pattern of mounting bores defined in an insulating body assembly when the outer frame assembly is disposed in common alignment with the insulating body assembly, an inner frame assembly including a multi-part inner frame assembly having a set of discrete inner frame side members, a plurality of mounting studs projecting from the inner frame assembly in a second pattern aligned with a second complementary pattern of mounting bores in a rear surface of the insulating body assembly, each mounting bore having a respective mounting bore sidewall spaced from an aligned mounting stud received therein, and a curing connection medium in the plurality of mounting bores to define a plurality of mounting connections from the inner and outer frame assemblies to the insulating body assembly.

SUMMARY OF THE INVENTION

In one embodiment, the present invention includes a window element that includes a frame assembly configured to support an insulating glass unit, wherein the frame assembly may include a plurality of frame structural layers arranged in a sandwich structural configuration. The frame assembly preferably includes an outer frame assembly, an insulating body assembly, an inner frame assembly, stop frame assembly and divider grid. The outer frame assembly may include a continuous flat metal outer frame assembly joined in abutting surface to surface relationship with an outer side of insulating body assembly by a plurality of outer frame mounting tabs or continuous linear strips.

In a preferred embodiment, the outer frame assembly and the inner frame assembly may include a plurality of mounting tabs or a continuous linear strip aligned to be received in a corresponding slot or continuous linear groove to form mounting tab connections with the abutting insulating body assembly by being adhered together with curing connection medium and mechanical fasteners. Tabs or continuous linear strips may be joined to the inner and outer frame assemblies by any suitable method, preferably including welding techniques such as spot weld, laser weld, fusion weld, Short Cycle Weld, Tig Weld, or Mig weld. Alternatively, CD (Capacitor Discharge) or Arc welding may also used to adjoin the tabs to the metal outer frame, and in that process, the tabs are preferably formed with a row of teeth on a bottom portion thereof, so that the weld is spread evenly.

An insulating glass unit is inserted between the inner frame assembly and the outer frame assembly (collectively referred to as the outer metal frame assembly) within the insulating body assembly. The insulating glass unit may include at least two glass panes that are spaced apart to provide a sealed air space therebetween. The sealed air space provides a thermal gap between the first and second glass panes, and may be at low pressure, or may include an inert gas, other than air, as well as a desiccant to reduce humidity.

BRIEF DESCRIPTION OF THE DRAWINGS

These and other features, aspects, and advantages of the present invention will become better understood with regard to the following description, appended claims, and accompanying drawings where:

FIG. 4A is a partial cross-sectional view of one embodiment of a window frame assembly including an insulating body assembly with mounting tabs disposed within a linear groove, and being secured thereto by screws and a curing connection medium;

FIG. 4B is another partial cross-sectional view of one embodiment of a window frame assembly including an insulating body assembly with mounting tabs disposed within a linear groove, and being secured thereto by screws;

FIG. 5A is a partial cross-sectional view of one embodiment of a window frame assembly including an insulating body assembly with mounting tabs disposed within a linear groove, further showing screws and mechanical connectors for securing elements of the window frame assembly together;

FIG. 5B is a partial cross-sectional view of one embodiment of a window frame assembly including an insulating body assembly with mounting tabs disposed within a linear groove, further showing screws and mechanical connectors for securing elements of the window frame assembly together;

DETAILED DESCRIPTION OF THE INVENTION

Figure 1:
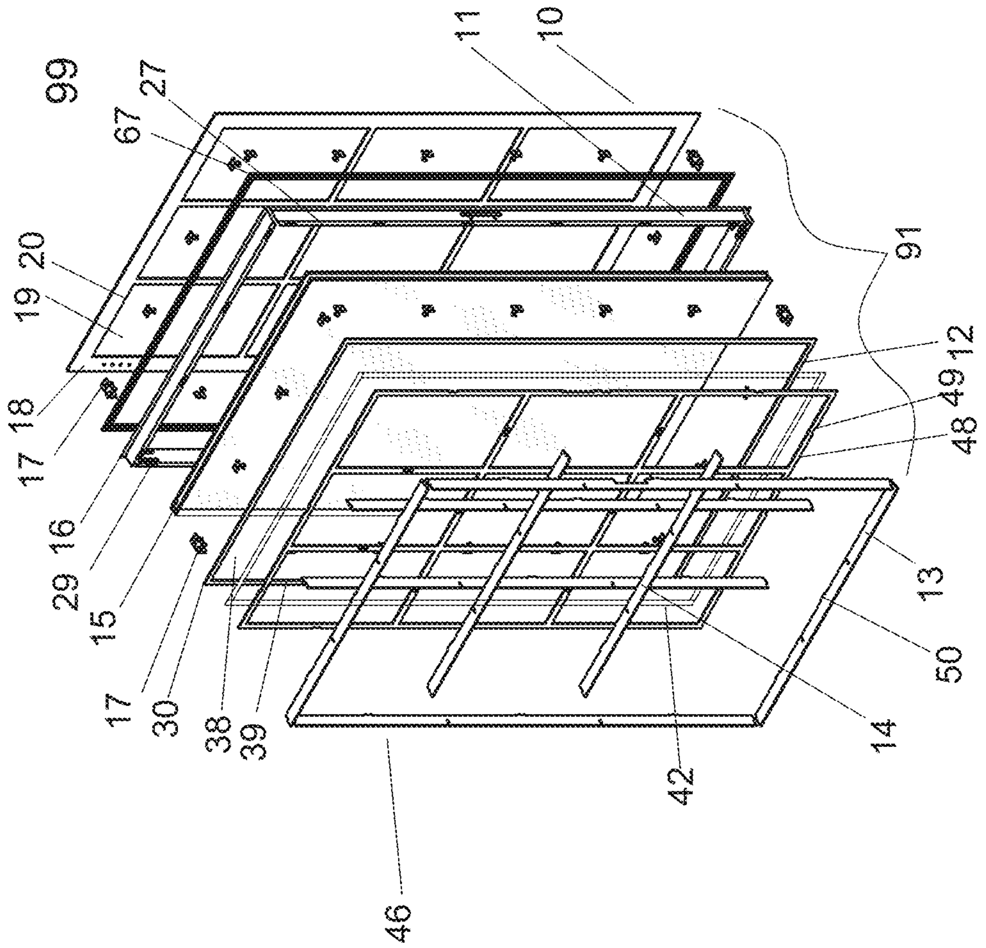
FIG. 1 is a perspective, exploded view of one embodiment of a window element showing an outer frame assembly, an insulating body assembly, an inner frame assembly, stop frame assembly, an insulating glass body divider grid, which are assembled into a sandwich configuration.
Figure 2:
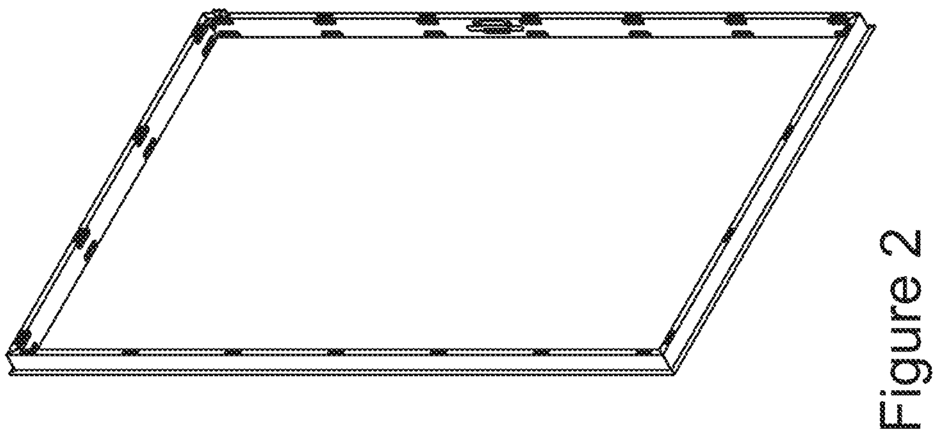
FIG. 2 is a perspective view of one embodiment of an insulating body assembly having a series of countersunk slots and linear grooves for receiving a series of mounting tabs that are used to form a connection between the insulating body assembly and the inner and outer frame assemblies.

The following reference numerals correspond to the following components herein:

| | |
|---|---|
| 10 | Outer Frame Assembly |
| 11 | Insulating Body Assembly |
| 12 | Inner Frame Assembly |
| 13 | Stop Frame Member |
| 14 | Divider Grid |
| 15 | Insulated Glass Assembly |
| 16 | Outer Face - Insulating Body Assembly |
| 17 | Outer Frame Mounting Tabs |
| 18 | Inner Surface of Outer Frame Assembly |
| 19 | Outer Frame Assembly Interior Opening |
| 20 | Inside Edge of Flat Metal Outer Frame Member |
| 21 | Linear Groove of Abutting Insulating Body Assembly |
| 22 | Curing Connection Medium |

-continued

| | |
|---|---|
| 23 | Mechanical Fasteners |
| 24 | Slots |
| 25 | Perpendicular Face of Abutting Insulation |
| 26 | Hole-Mounting Tab |
| 27 | Inner Side of Insulating Body Assembly (11) |
| 29 | Slot for Receiving Inner Frame Tab |
| 30 | First Surface of Inner Frame Assembly (12) |
| 33 | Mechanical Connector |
| 35 | Grooves for Mechanical Connectors |
| 36 | Wood Stop Member |
| 37 | Trim |
| 38 | Inner Frame Interior Opening |
| 39 | Interior Edge of Inner Frame Member 12 |
| 40 | Glazing Blocks |
| 41 | Structural Silicone Members |
| 42 | Double Side Adhesive Mounting Tape |
| 43 | First Glass Pane |
| 44 | Second Pane |
| 45 | Internal Glass SDL Bar |
| 46 | Stop Frame Assembly (Unit) |
| 48 | Flat Base Plate |
| 49 | Notches in Base Plate (Counterbores) |
| 50 | Locating Tongue |
| 51 | Sealed Air Space |
| 52 | Spacer |
| 53 | Dessicant(s) |
| 56 | Bottom Edge of Tabs |
| 57 | Teeth (Tabs) |
| 64 | Rebate |
| 65 | Weather Strip |
| 99 | Window/Door Element |

The present invention, in a first embodiment, includes window or door element having a frame assembly and an insulated glass unit inserted into the frame assembly, wherein the frame assembly includes an inner frame assembly, and an outer frame assembly formed into a sandwich configuration, along with other structural components, as discussed hereinbelow.

It will be appreciated that for simplicity and clarity of illustration, where considered appropriate, reference numerals may be repeated among the figures to indicate corresponding or analogous elements. In addition, numerous specific details are set forth in order to provide a thorough understanding of the implementations described herein However, it will be understood by those of ordinary skill in the art that the implementations described herein may be practiced without these specific details. In other instances, well-known methods, procedures and components have not been described in detail so as not to obscure the implementations described herein. Also, the description is not to be considered as limiting the scope of the implementations described herein.

The detailed description set forth herein in connection with the appended drawings is intended as a description of exemplary embodiments in which the presently disclosed apparatus and system can be practiced. The term "exemplary" used throughout this description means "serving as an example, instance, or illustration," and should not necessarily be construed as preferred or advantageous over other embodiments.

Frame Assembly

FIG. 1 is an exploded view of the assembly of a window or door element 99 of a window or door system, according to an embodiment. As shown in FIG. 1, the window or door element 99 includes a plurality of structural elements formed in a manner to accept an insulated glass assembly 15. The metal frame assembly 99 in a preferred embodiment, may include a plurality of frame structural layers arranged in a sandwich structural configuration, including an outer frame assembly 10, an insulating body assembly 11, an inner frame assembly 12, stop frame assembly 13 and divider grid 14. As shown in FIG. 1, The metal frame assembly may include a continuous flat metal outer frame assembly 10 joined in abutting surface to surface relationship with an outer side of insulating body assembly 16 by a plurality of outer frame mounting tabs 17 or continuous linear strips placed along the length of the inner surface 18 of the outer frame assembly. As shown in FIG. 1, the outer frame assembly 10 may include an outer frame interior opening 19 defined by an inside edge of continuous flat metal outer frame member 20.

Figure 3:
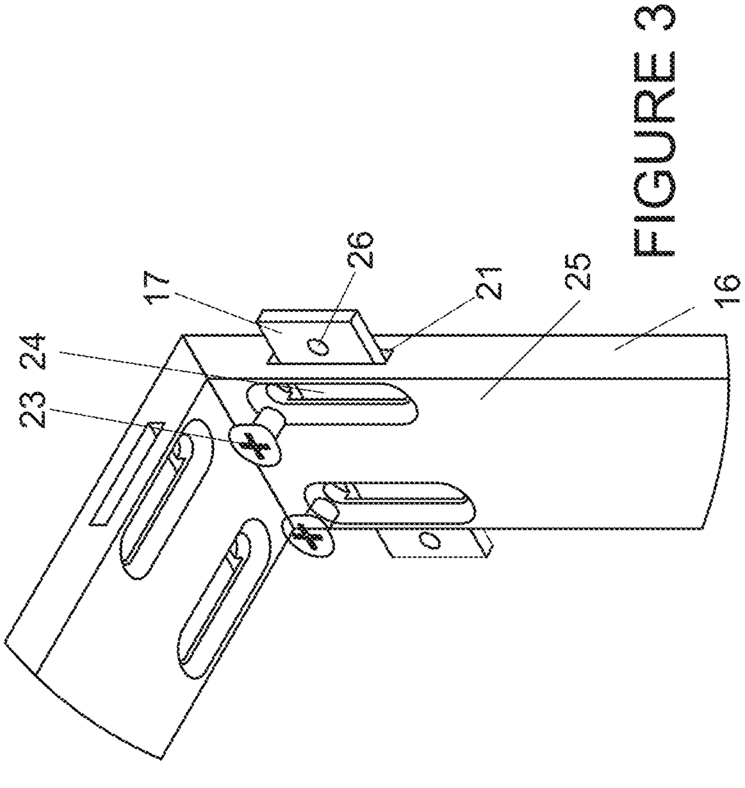
FIG. 3 is a perspective inset view of a corner of an insulating body assembly as set forth in FIG. 2, further showing the tabs partially inserted into the grooves formed in the insulating body assembly, and further showing countersunk slots for receiving screws (or other mechanical connectors or fasteners)

In a preferred embodiment, the insulating body, as shown in FIG. 3, includes a plurality of outer frame mounting tabs 17 or a continuous linear strip that is aligned to be received in a corresponding slot 21 or continuous linear groove of abutting insulating body assembly 16 to form mounting tab connections. As shown in FIG. 4-A, These mounting tabs 17 are formed in a bonded relationship with a curing connection medium 22 disposed between the abutting outer surface of the insulation body 16 and the inner surface 18 of the outer frame assembly 10.

Additionally, as shown in FIG. 3, mechanical fasteners 23 may be mounted through a plurality of slots 24 in the perpendicular face of the abutting insulation 25 into a corresponding hole 26 in the mounting tab 17 of the outer frame assembly 10. The curing connection medium 22 shown in FIG. 4A, for example, may be formed by mixing epoxy resin with a hardening agent which initiates curing reactions. The curing reaction product, when hardened, may fill the interstitial space in the mounting slots or continuous linear groove 21 in order to form the bonded mounting tab 17 connections between the outer frame assembly 10 and the abutting insulating body assembly 11.

The curing connection medium of epoxy resin 22 may provide an integrated mounting connection relationship between the outer frame mounting tabs 17 or continuous linear strip and mounting slots 24 of the insulating body assembly 21, and thus may join the outer frame assembly 10 in integral mounting connection relationship with the insulating body assembly 11.

Similarly, as shown in FIG. 1, the frame assembly 99 may also include a flat metal inner frame member 12 joined in abutting surface to surface relationship with an inner side 27 of the insulating body assembly 11 by a plurality of inner frame tabs 17 or a series of continuous linear strips 17 that engage with corresponding grooves 21 or slots 24. The tabs or continuous linear strip 17 may be spaced along the length of the first surface of flat metal 30 of the inner frame assembly 12. As shown in FIG. 4-B, the inner frame assembly 12 may include a plurality of inner frame tabs 17 or a series of continuous linear strips 17 that are aligned to be received in corresponding slots 24 or continuous linear grooves 21 located on the inner side 27 of the abutting insulating body assembly 11 to form connections, in a manner similar to the mounting tab bonds formed between the outer frame assembly 10 and the abutting insulating body assembly 11 described above. A curing connection medium 22 may be formed from a cured reaction product of epoxy resin by mixing with a hardening agent to initiate the curing reaction. This curing reaction product may fill the interstitial spaces within the inner frame assembly 12, similarly to that described in the outer frame assembly hereinabove.

Figure 6:
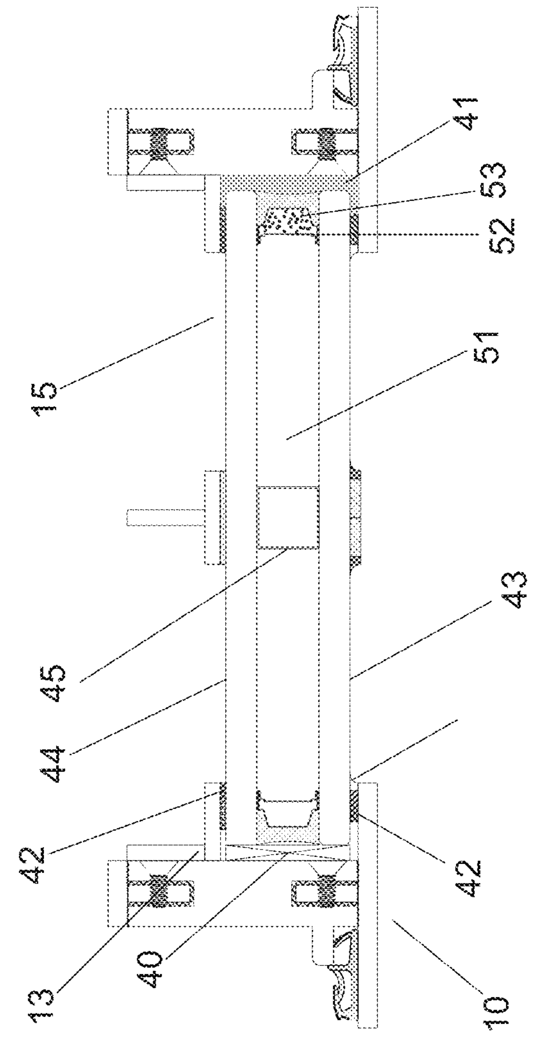
FIG. 6 is a cross-sectional view of a window frame assembly including an insulated glass unit having first and second glass panes separated from one another to create a sealed air space therebetween.

As shown in FIG. 1, the inner frame assembly 12 may include an inner frame interior opening 38 defined by an interior edge 39 of a continuous flat inner frame assembly 12. It is understood the interior frame opening 38 may be larger than the outer frame opening 19. It will be understood the interior frame opening 38 may be large enough to enable the insertion of an insulating glass body 15 or insulated panel during the assembly of door or window element 99, with a margin of clearance that may be filled with glazing blocks 40 and or structural silicone members 41 shown in FIG. 6. As shown in FIG. 6, stop frame members 13 serve to fix the insulating glass unit 15 into abutting relationship between outer frame members 12 having double side adhesive mounting tape 42 against the first glass pane 43 thereof, and inner stop members 13 having double side adhesive mounting tape 42 against the second pane 44 thus sandwiching the insulated unit 15 into a fixed position.

Door or window element 99 may have a simulated divided light configuration including a divider grid member 14 against insulating glass unit 15. As shown in FIG. 1, window element 99 may include a stop frame assembly 13 extending about the opening 38 defined by the interior edge 39 of the inner frame assembly 12. Stop frame assembly (46) may include a plurality of adjoined stop frame members 13. Stop frame members 13, for example, may be formed of extruded metal, such as aluminum, and may have a truncated triangular cross-sectional shape. Stop frame member 13 may also be laser cut to form a 3-dimensional assembled profile from flat metal. In this method, the flat base plate 48 is applied to the inner layer of glass with adhesive material, which may be double-sided adhesive mounting tape 42 and pressed to inner side of insulated glass unit 15 for joining same in fixed supporting relationship. Stop members 13 are then joined to the base plate 48 by a plurality of locating tongues 50 on the stop member 13 that are inserted into a plurality of notches 49 in base plate 48.

As shown in FIG. 5-A, it should be understood that the frame assembly 99 may be formed with a metal exterior 10, while the inner frame assembly may be formed with a metal interior base 12 with an attached trim 37 from wood, fiberglass, PVC, or the like, wherein the components are connected by a plurality of mechanical connectors 33 attached with mechanical fasteners 23 through corresponding holes in the face of inner frame assembly 12 and adhesive method, as described herein. This arrangement provides for a wood clad window to be integrated into the sandwich configuration using the same technology and techniques as set forth herein.

As shown in FIG. 5-B, It should be understood that the frame assembly may be formed so that the outer frame assembly 10 is formed from metal, while the inner frame assembly 37 may be formed from wood, fiberglass, PVC, or the like, wherein the components are connected by a plurality of mechanical connectors 33 and corresponding grooves 35 in the abutting face of the insulating body 11 and adhesive method, as described herein. This arrangement provides for a wood clad window to be integrated into the sandwich configuration using the same technology and techniques as set forth herein.

Insulated Glass Unit

As shown in FIG. 6, an insulating glass unit is inserted and sandwiched between the inner frame assembly and the outer frame assembly within the insulated body assembly.

The insulating glass unit 15 may include a first glass pane 43 and a second glass pane 44 that are spaced apart by a spacer 52 to provide a sealed air space 51 therebetween. The insulated glass unit 15 may include internal divider bars 45 within the air space 51 to provide a simulated divided lite. The insulating glass unit 15 may include a continuous seal 41 adjacent to the air spacer 52 to provide a sealed air space 51. The sealed air space 51 provides a thermal gap between the first 43 and second glass panes 44, and may be at low pressure, or may include an inert gas, other than air, as well as a desiccant to reduce humidity. It should be noted that more than two panes of glass may be disposed within the insulating glass unit, as desired. The insulating glass unit 15 may include a continuous seal adjacent to spacer 52 and disposed between first glass pane 43 and second glass pane 44. Continuous seal may be configured for cooperation with first glass pane 43 and second glass pane 44 to provide the sealed air space 51. Air space 51 may be at low pressure, or may include a gas other than air, to provide a thermal gap between first glass pane 43 and second glass pane 44. Insulating glass unit 15 spacer 52 may include desiccants 53 to reduce humidity.

Tabs

Figure 7:
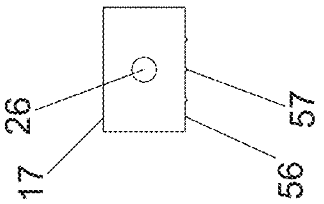
FIG. 7 is a front view of one embodiment of a mounting tab defining a hole therein for receiving a screw or other fastening device, and further showing a series of teeth disposed along a bottom edge thereof.

The tabs 17, as shown in FIG. 7, in a preferred embodiment, are generally flat, rectangular structures that define a hole 26 in a middle portion thereof, and the tabs are attached to the inner and outer frame assembly by any suitable method, but preferably by welding techniques discussed in greater detail hereinbelow. As shown in FIG. 3, the tabs 17 allow the inner and outer frame assemblies to be secured to the insulating body assembly by sliding the tabs 17 into corresponding slots 21 or grooves disposed along the sides of the insulating body assembly 16, as shown in FIG. 3. After insertion of the tabs into the slots or grooves of the insulating body assembly, a screw 23 is inserted into each tab 17, as shown. In a preferred embodiment, a slot 24 is provided in a corresponding position on the insulating body assembly to insert the screw 23 into the hole 26 in the tab 17 in order to tighten and secure the assembly together. As shown in FIG. 4-A, the tab is secured to outer frame inner side 16 by preferred method of welding. As shown in FIG. 7, The tab 17 has a unique design to allow the bottom edge 56 to be welded to the metal face. The tab 17 has small teeth 57 along the bottom edge 56 of the tab 17 to allow a successful CD, short cycle, or Arc weld to continuously weld along the bottom edge 56 of the tab 17 without causing distortion to the outer face of the frame. Alternatively, continuous linear strips that extend lengthwise along the interior sides of the outer and inner frame assemblies may be used in the place of tabs, although the purpose and function of the interior linear strips are the same as the tabs.

Mechanical Fasteners and Connectors

Figure 8:
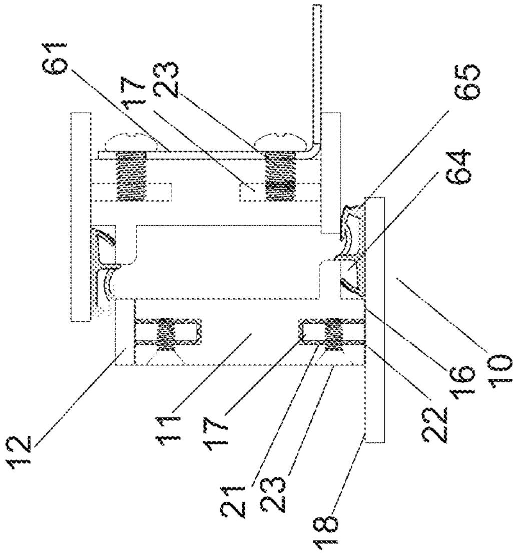
FIG. 8 is a cross-sectional offset view of one embodiment of a window frame assembly, showing an insulating body assembly sandwiched between an outer frame assembly and an inner frame assembly, creating a rebate for a weather strip.

Mechanical fasteners 23, such as screws, or other types of mechanical connectors 33 such a Knapp S-klick may be used to connect structural components of the frame assembly together, along with the tabs 17 or continuous linear strips, as shown in FIG. 4A. The mechanical fastener 23 when connected to tab 17 holds the edge of pultrusion to the interior face of the inner surface 18 of the outer frame assembly 10. This configuration eliminates the need for excessive dry times for adhesive and space for clamping, which is novel and unique, as window and door elements formed into sandwich configurations traditionally employ the adhesive to hold the frame together and are bound by dry times. Mechanical fasteners 23 or connectors 33 may also be used to connect hardware, brackets, or similar hardware to the metal tabs rather than the fiberglass. As shown in FIG. 8, mechanical fasteners 23 may be used to connect an installation plate 61 to the window or door frame by threading into tab 17. This configuration eliminates the need for an additional internal nut to be inserted for the screw to thread into, which is novel and unique, as window and door elements formed into sandwich configurations traditionally require? a secondary method for screws tapped into fiberglass.

One example of a mechanical connector 33 that may be used as shown in FIG. 5-B is the S-Klick connector, which is commercially available from Knapp Connectors.

Forming Frame Assembly Components

In some embodiments, each of the components of the frame assembly 99, including the outer frame assembly 10, the insulating body assembly 11, the inner frame assembly 12, the stop frame assembly 46 46 and divider grid 14 as shown in FIG. 1, may be formed from metal sheets using such techniques as laser cutting, water jet cutting and plasma cutting. Tabs 17 or continuous linear strips may be joined to inner frame assembly 12 and outer frame assembly 18 10 by welding techniques including, but not limited to, a spot weld, laser weld, fusion weld, tig weld, or mig weld. Alternatively, CD (Capacitor Discharge), arc welding, or short cycle welding may also be used to adjoin the tabs 17 to the inner frame assembly 12 and outer frame assembly 10 as shown in FIG. 1 and in that process, as shown in FIG. 7, the tabs 17 are preferably formed with a row of teeth 57 on a bottom edge 56 thereof, so that the weld is spread continuous and evenly. This process eliminates the distortion typically found in the metal when welding continuously, which is novel and unique, because typically this process is is limited to a stud or spot weld. These welding processes may also be used to attach continuous linear strips to the inner and outer frame assemblies, instead of tab members.

Insulating Body Member

As shown in FIG. 8, when the insulating body 11 is sandwiched between the outer frame assembly 10 and the inner frame assembly 12, that arrangement creates a rebate 64 for a weather strip 65 to be inserted and cut so that the corners thereof may be welded into a one-piece continuous seal as shown in FIG. 1 67. This configuration eliminates the need for an adhesive backed weather seal, which is novel and unique, as window and door elements formed into sandwich configurations traditionally employ adhesive backed weather seals.

The insulating body 11 positioned between the outer frame assembly 10 and inner frame assembly 12 can consist of very different materials in this connection. For example, suitable materials include GFRP (glass-fiber-reinforced plastic), glass-fiber-reinforced polyamide, polyurethane, and similar materials.

Interior Stop Frame Member

As shown in FIG. 1, interior stop frame members 13 may be formed from extruded aluminum or laser welded metal profiles including but not limited to rectangular, truncated triangular, or angled cross sectional shapes. Alternatively, the interior stop frame member 13 may be formed by using 2D metal laser cut metal in a manner with locating tongue (50) and notches 49 and corresponding notching that, when assembled into a 3-D grid, requires no additional fasteners or studs. These methods are extremely cost and labor efficient as they obviate the need for manual notching, grinding, extrusions or welding on the face of the structural components. Stop frame members 13 may be joined to an abutting inner frame assembly along the common lengths thereof. The window element may further include adhesive material such as double-sided adhesive mounting tape 42 that is positioned between the insulating glass assembly 15 and the stop frame member 13 for joining same in a fixed, supporting relationship.

Manufacturing Process

It should be understood that there are various methods that may be used to manufacture the present door or window element. The following process is one preferred method, and is included for exemplary purposes:

1. Laser Cut, water jet, plasma, cut, or similar the exterior part of the frame out of sheet of metal w/the grid pattern in tact.
2. Laser Cut, water jet, plasma, cut, or similar the Interior part of the frame out of sheet of metal with the interior opening offset from the exterior of the frame interior opening to create a fixed stop to support the glass
3. Laser Cut, water jet, plasma, cut, or similar custom tabs, preferably with teeth disposed across a bottom edge thereof, and cutting or otherwise providing a hole in the center for the mechanical fastener.
4. Separate tabs from the sheet and tap each hole to thread to accept the mechanical fasteners
5. Weld the tabs to the back of both the interior and exterior metal skins of the sash in a same pattern to be machined in the fiberglass which is etched on the metal by the laser as a guide
6. Cut Fiberglass Pultrusion (comes in lineal sticks per order; for example 20') into 4 pieces or sections on a mitre saw.
7. Place the four pieces of Fiberglass pultrusion and put on a CNC milling machine to mill the slots in the edge to accept the tabs, and the counter sunk slots in the face to accept the screws or other mechanical fasteners.
8. Lay the exterior metal sash face down on a table with the tabs facing up.
9. Apply adhesive to exterior face of the fiber glass and slide slots over the tabs to the interior face of the exterior metal.
10. Apply adhesive to interior face of the fiber glass.
11. Insert the side of the interior metal frame with the tabs down into the fiberglass
12. Clamp apparatus down with pressure
13. Insert all mechanical fasteners once sash is securely clamped into a flat position
14. Unclamp sash
15. Paint Sash with glass out.
16. Apply Double Sided Adhesive tape to the edge of the interior opening of the exterior sash and along the grid pattern to accept the glass
17. Apply Structural silicone between the fiberglass and the double-sided adhesive tape (adhesive tap prevents it from oozing out and causing a mess on the visible portion of the glass)
18. Insert glass into opening from interior and apply pressure down.
19. Back fill around the glass with silicone
20. Laser Cut interior Glass stop and muntins from a sheet using a series of counter notches to create 3d profile stop or cut the stop from a laser welded or extruded profile such as rectangular, sloped, or other suitable shapes.
21. Apply Double sided adhesive tape to the back of the interior stop and press it down to the glass.
22. Cut in weather seal around the sash and weld corners after fitting.
23. Install hinges and Locks.

Although the present invention has been described in considerable detail with reference to certain preferred versions thereof, other versions are possible. Therefore, the spirit and scope of the appended claims should not be limited to the description of the preferred versions contained herein. All features disclosed in this specification may be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. A window or door element comprising:

a frame assembly;

wherein the frame assembly comprises an outer frame assembly, an inner frame assembly, and an insulating body assembly positioned between said outer frame assembly and said inner frame assembly, using sandwich construction;

an insulated glass unit is disposed between said inner frame assembly and said outer frame assembly, and said insulated glass unit includes a first windowpane and a second windowpane that are spaced apart to create a sealed air space therebetween;

a series of mounting tabs are attached to an inner surface of said outer frame assembly;

a series of mounting tabs are attached to an inner surface of said inner frame assembly, and each mounting tab defines a hole therethrough for receiving a mechanical fastener;

said insulating body assembly includes a first series of corresponding slots on a first side thereof for receiving mounting tabs connected to said outer frame assembly, and a second series of corresponding slots on a second side thereof for receiving mounting tabs connected to said inner frame assembly; and wherein said mechanical fasteners are disposed through said holes defined by said mounting tabs to connect said mounting tabs to said insulating body assembly.

2. The window or door element set forth in claim 1, further including at least one mechanical connector for connecting said insulating body assembly to said outer frame assembly.

3. The window or door element set forth in claim 1, further including at least one mechanical connector for connecting said insulating body assembly to said inner frame assembly.

4. The window or door element set forth in claim 1, further including a divider grid that is sandwiched between said first windowpane and said second windowpane.

5. The window or door element set forth in claim 1, further including a stop frame assembly extending about an interior portion of said inner frame assembly.

6. The window or door element set forth in claim 5, wherein said stop frame assembly comprises a plurality of stop frame members that are affixed an inner portion of said insulated glass unit with adhesive material.

7. The window or door element set forth in claim 1, wherein said insulating body assembly forms a generally rectangular shape having four corners, and wherein each corner includes a seal that is welded to form a monolithic outer structure having a continuous seal around a perimeter thereof.

8. The window or door element set forth in claim 1, wherein said outer frame assembly is formed from metal, and said inner frame assembly is formed from wood.

* * * * *